Aug. 4, 1964    E. CAMPOS    3,142,935
PLANT ACCESSORY
Filed Jan. 17, 1963
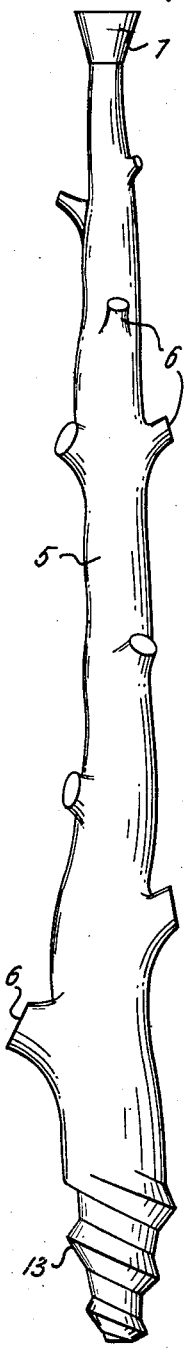
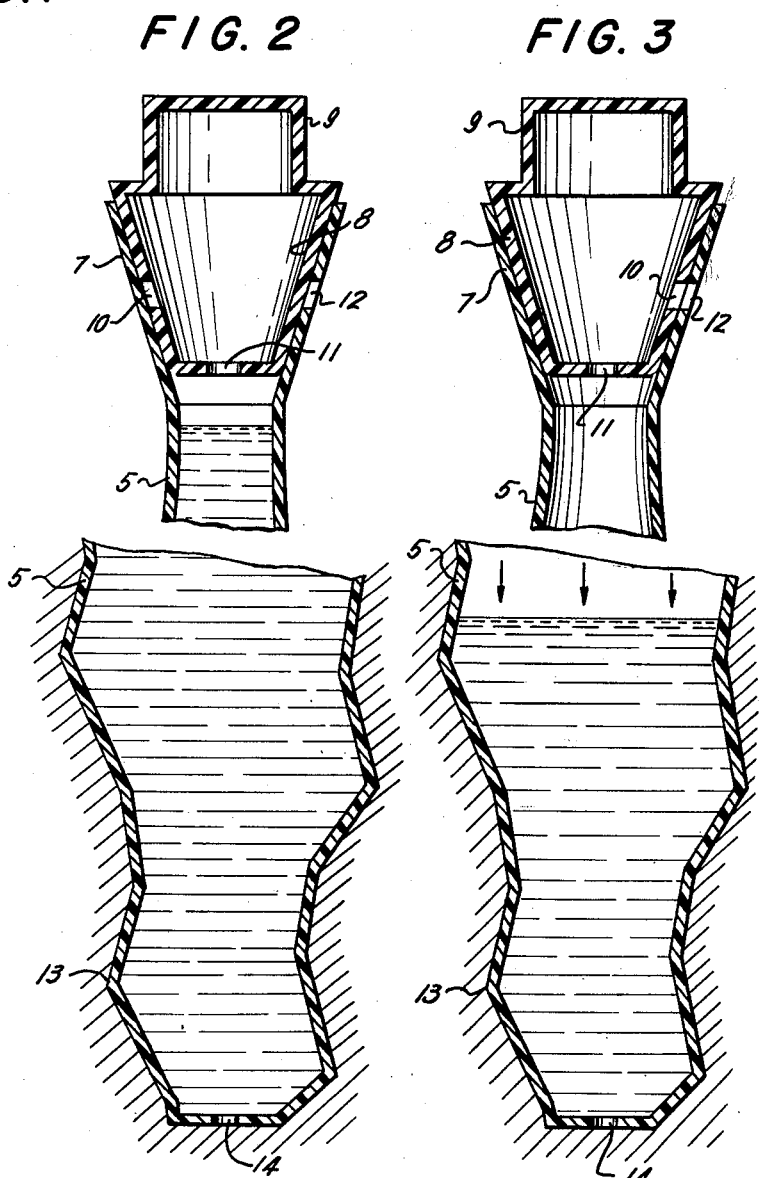
INVENTOR.
EMIL CAMPOS
BY
Kane, Dalsimer and Kane
ATTORNEYS 3,142,935
PLANT ACCESSORY
Emil Campos, Hoboken, N.J., assignor to Plastic Plants, Inc., Hoboken, N.J., a corporation of New Jersey
Filed Jan. 17, 1963, Ser. No. 252,210
4 Claims. (Cl. 47—48.5)

This invention relates to a structurally and functionally improved plant accessory to be manually operated and by means of which plants and especially their roots may be watered, fed, or supplied with a solution within which a fertilizer may be included.

It is a primary object of the invention to furnish a unit of this type which may readily be transported as desired and caused to penetrate into the earth if necessary with minimum exertion on the part of the user.

A further object is that of designing an accessory in which the liquid feed may be controlled with nicety and when desired the unit may be refilled with liquid in a few seconds.

Among additional objects are those of furnishing a plant accessory which will present an artistic appearance, may be readily manipulated and also produced at minimun cost.

With these and other objects in mind, reference is had to the attached sheet of drawings illustrating one practical embodiment of the invention and in which:

FIG. 1 is a side elevation of the assembly providing the accessory and showing the control or closure element therefore separated from its body;

FIG. 2 is a fragmentary sectional side view of the accessory and illustrating its inoperative condition;

FIG. 3 is a view similar to FIG. 2 but showing the parts shifted to a station under which a dispensing of liquid occurs; and FIG. 4 is a plan view of the unit as shown in the preceding figures.

Referring primarily to FIG. 1 the numeral 5 indicates the main body of the device which is hollow and preferably formed of a suitable plastic material. In appearance it simulates the stem or trunk of a plant and has extending from its surface hollow projections 6 communicating with its interior. These projections again preferably simulate in appearance branch stubs and have their outer ends closed. As shown their faces are preferably irregular as is also the outer face of body 5; the latter being conveniently flared in a downward direction and thus providing a main liquid reservoir supplemented by the storage spaces furnished by the stubs 6.

In order to supply liquid to the interior of the assembly its upper end preferably terminates in a funnel shape portion 7, the inner face of which presents a surface sealingly engaged by the outer face of a stopper body 8. That body is continued in an upward direction to furnish a stem 9 by means of which this closure may be rotated with respect to funnel portion 7. The stopper or valve part 8 is hollow and furnished with an inlet opening 10. Its base is formed with an outlet opening 11. Funnel portion 7 is provided with an inlet opening 12 which may be aligned with opening 10 as the valve or closure is rotated axially of the unit.

It is preferred that the unit be capable of penetrating earth and to facilitate such action its lower end is tapered and formed with a spirally extending thread 13. In any event its lowermost surface is formed with an opening 14 through which communication is established with the interior of body 5 and projections 6.

It is obvious in use that with the device resting in sealing engagement with a supporting surface the closure at its upper end may be removed and by a spout or otherwise its interior filled with liquid. This liquid may simply be water. Otherwise it may be a solution involving a fertilizing agent or agents or else a suitable insecticide. In any event with a filling of the body to a desired depth, the closure may be applied to the inner surface of the funnel 7 as in FIG. 2. So applied no communication will exist through openings 10, 11 and 12. The opening 14 at the lower end of the unit is preferably of a smaller diameter than the former openings. In any event the filled unit may now be lifted in that the seal at its upper end which prevents air being vented into its interior will preclude a discharge of liquid through opening 14.

Upon reaching a desired location adjacent the plant the user may apply the lower end of the unit to the surface of the earth and by rotating the unit will cause its lower end to drill into the earth and thus locate that end below the surface. Now by turning the closure by means of its actuator 9 openings 10 and 12 may be aligned to a greater or lesser extent. So aligned they will permit an inrush of air through opening 11 into the body interior as a result of which the liquid level will drop in the manner indicated in FIG. 3. The rapidity of the drop will of course be subject to being governed by the volume of air admitted. As is apparent the device with its drill end embedded in the earth may be left in position for any desired interval of time so that it will, for example, slowly feed the liquid solution through opening 14.

When it is necessary to refill the unit by simply removing the valve or closure at its upper end a desired insecticide or fertilizer may be introduced to furnish a proper solution. Otherwise and in all events water will be caused to flow through funnel portion 7 to fill body 5 as in FIG. 2. By reintroducing the closure as in the latter figure the entire sequence of operations may be repeated with facility and without employing any special skill.

Thus among others the several objects of the invention as specifically aforenoted are achieved. Obviously numerous changes in construction and rearrangement of the parts may be resorted to without departing from the spirit of the invention as defined by the claims.

I claim:
1. An article of the character described for the dispensing of liquid to plants, said article comprising a body simulating in appearance a main vertically extending trunk and branch stubs extending therefrom, the body and stubs being hollow, the opposite ends of said body being formed with openings for the receiving and discharge of liquid, the cavity of the body providing a main reservoir portion and the cavities defining the hollow interior of said stubs communicating therewith to provide auxiliary reservoir portions, a venting valve body controlling the inflow of air through the upper end of said body and movably engaged with the surface of the latter for that purpose, said valve body being hollow and presenting a side as well as a lower surface both formed with openings and the adjacent surface of said trunk body being formed with an opening alignable with the opening in the side surface of said valve body.

2. In an article as defined in claim 1, the effective opening at the upper end of said body being larger than the effective opening at the lower end thereof.

3. In an article as defined in claim 1, a funnel defining said upper end of said body, said venting valve being disposed within said funnel and shiftable with respect to the same to permit the inflow of air through said funnel into said body.

4. The invention in accordance with claim 1 wherein a convolute screw surface defining the lower end of said trunk body and said branch stubs providing extensions engageable by the hand of the user for ready turning of said body.

References Cited in the file of this patent

UNITED STATES PATENTS

| | | |
|---|---|---|
| D. 71,328 | Buchan et al. | Jan. 12, 1926 |
| 897,131 | Owen | Aug. 25, 1908 |
| 1,577,873 | Root | Mar. 23, 1926 |
| 2,685,761 | Schlesser | Aug. 10, 1954 |
| 3,077,166 | Delp | Feb. 12, 1963 |